United States Patent Office 3,620,118
Patented Nov. 16, 1971

3,620,118
TAMBOURINE
Yoshiyuki Koishikawa, 2365 Kawarado-cho,
Yokkaichi, Mie, Japan
Filed Nov. 16, 1970, Ser. No. 89,948
Int. Cl. G10d 13/02
U.S. Cl. 84—418                                         4 Claims

ABSTRACT OF THE DISCLOSURE

A tambourine comprising a cylindrical frame having a plurality of recesses formed in the upper surface thereof at a predetermined interval, a tightening ring having a plurality of projections formed on the surface confronting said cylindrical frame at a predetermined interval for interlocking engagement with said recesses respectively, a tambourine sheet having a plurality of through-holes formed in the peripheral edge portion at a predetermined interval for receiving said projections respectively when it is clamped between said cylindrical frame and said tightening ring at its peripheral edge, and a tightening member for tightening said tightening ring around said cylindrical frame.

---

This invention relates to a tambourine and more specifically to improvements in the securement of a tambourine sheet to the cylindrical frame of a tambourine.

An object of the present invention is to provide an improved tambourine in which a tambourine sheet can be secured to the cylindrical frame of the tambourine in a simple manner and fastly.

Another object of the invention is to provide an improved tambourine in which a tambourine sheet can be maintained in a stretched state across the cylindrical body of the tambourine under uniform tension over the entire area thereof.

Still another object of the invention is to provide an improved tambourine which is simple in construction and adapted to mass production.

In order to attain the objects set forth above, a tambourine according to the present invention comprises a cylindrical frame having a plurality of recesses formed in the upper surface thereof at a predetermined interval, a tightening ring having a plurality of projections formed on the surface confronting said cylindrical frame at a predetermined interval for interlocking engagement with said recesses respectively, a tambourine sheet having a plurality of through-holes formed in the peripheral edge portion at a predetermined interval for receiving said projections respectively when it is clamped between said cylindrical frame and said tightening ring at its peripheral edge, and a tightening member for tightening said tightening ring around said cylindrical frame.

Such being the construction, in assembling the tambourine of the invention by clamping the tambourine sheet between the cylindrical frame and the tightening ring at its peripheral edge, the tambourine sheet is first stretched across the cylindrical frame in such a manner that the peripheral edge portion of the former rests on the upper surface of the latter and the through-holes of the former are in registration with the corresponding recesses of the latter, and then the tightening ring is superposed on the cylindrical frame, with the projections thereof extending into the corresponding recesses of the latter through the through-holes of saidd tambourine sheet respectively, following which said tightening ring is tightened against the cylindrical frame by the tightening member.

Thus, in the tambourine according to the instant invention, the tambourine sheet is clamped at its peripheral edge between the cylindrical frame and the tightening ring and a slippage of the sheet relative to the cylindrical frame and loosening of the same are prevented by the projections of the tightening ring which extend through the corresponding through-holes of said sheet respectively and further the sheet is secured to the cylindrical frame in a tightly stretched state under uniform tension over the entire surface thereof. Therefore, there is no fear of the sheet wrinkling or the sound generated thereby varying in tone.

Moreover, since the tambourine sheet is clamped between the cylindrical frame and the tightening ring from both the upper and lower sides over the entire circumferential length of the peripheral edge thereof, the peripheral edge portion of the sheet is reinforced and thereof, the peripheral portion of the sheet is reinforced and there is no possibility of rupture of the sheet from said portion.

The novelties, advantages and other objects of the invention will become apparent from the following description on the embodiment thereof when taken in conjunction with the accompanying drawings.

Figure 1:
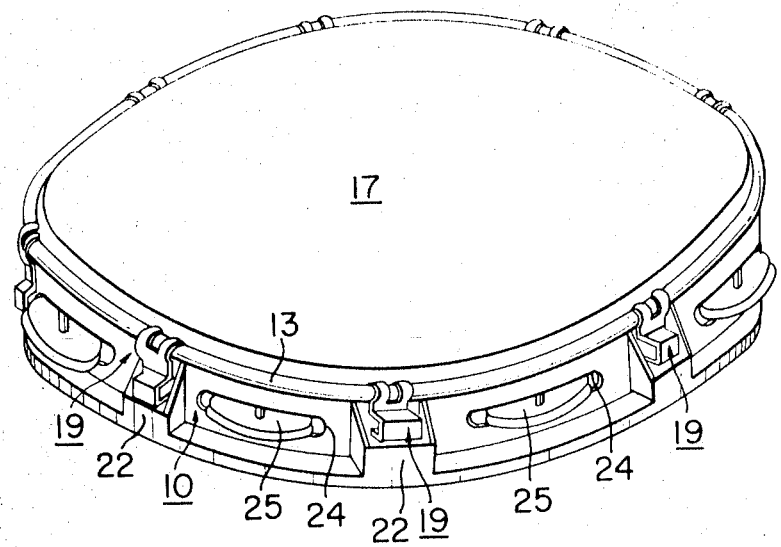
FIG. 1 is a perspective view showing a preferred embodiment of the tambourine according to the present invention.
Figure 2:
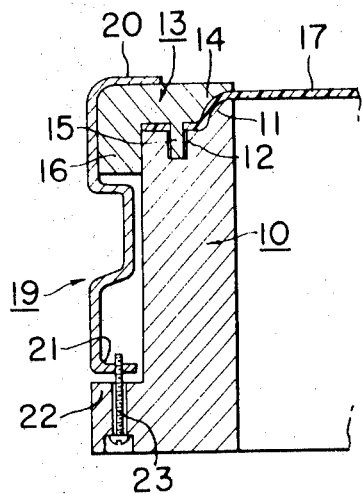
FIG. 2 is a fragmentary vertical cross-sectional side view of the tambourine.
Figure 3:
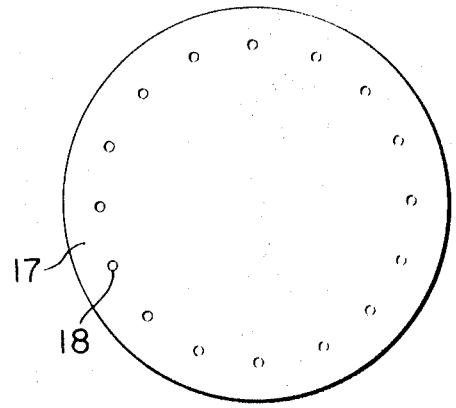
FIG. 3 is a plan view of the tambourine sheet.

Referring to FIG. 1, reference numeral 10 designates the cylindrical frame of a tambourine, which is made preferably of a synthetic resin or wood. The inner portion of the cylindrical frame 10 is raised upwardly to form an annular wall 11 having a convexed outer surface, and in the surface of a flat portion connected to said convexed surface are formed a plurality of recesses 12 at a predetermined interval.

Reference numeral 13 designates a tightening ring which has a concaved surface 14, complementary to the above-mentioned convexed surface, formed at the inner portion of the undersurface thereof and a plurality of projections 15 formed at a predetermined interval on the surface of a flat portion connected to said concaved surface, for interlocking engagement with the corresponding recesses 12 formed in the cylindrical frame 10. The tightening ring 13 also has an annular portion 16 extending vertically downwardly from the outer peripheral edge of said flat portion, which will be brought into abutting engagement with the outer peripheral surface of the cylindrical frame 11 when said tightening ring is tightened around said cylindrical frame.

Reference numeral 17 designates a tambourine sheet made of a synthetic resin or animal skin and having a plurality of through-holes 18 formed in the peripheral edge portion at a predetermined interval for receiving the corresponding projections 15 of the tightening ring 13 respectively.

Reference numeral 19 designates a tightening member having the upper edge flexed horizontally to form hooks 20 for engagement with the tightening ring 13. The lower edge of the tightening member 19 is also flexed horizontally to form a horizontal section 21 and an internally threaded hole is bored through said horizontal section 21. The lower portion of the cylindrical frame 10 is bulged outwardly as at 22 and a plurality of through-holes are bored through said bulged portion 22. A screw 23 is inserted into each of the through-holes in the bulged portion 22 of the cylindrical frame 10 from the underside and screw-threaded into the internally threaded hole in each of the tightening members 19.

In assembling the tambourine of the invention, therefore, the tambourine sheet 17 is first disposed across the top opening of the cylindrical frame 10, with the peripheral edge portion thereof resting on the peripheral wall of said cylindrical frame, and then the tightening ring 13 is fitted over the cylindrical frame in such a manner that the projections 15 thereof extend through the through-holes 18 of the tambourine sheet 17 and received in the recesses 18 in the cylindrical frame 10 respectively, thereby clamping the peripheral edge portion of said sheet between it and the cylindrical frame. Thereafter, each of the tightening members 19 is attached to the tightening ring 13, with the hooks 20 thereof overlying the upper surface of said tightening ring, and the screw 23 is inserted into the corresponding through-hole formed in the bulged portion 22 of the cylindrical frame and screwed into the internally threaded hole in the lower horizontal section 21 of said tightening member, whereby the tightening ring 13 is tightly secured to the cylindrical frame and the peripheral edge portion of the sheet 17 is fastly secured therebetween.

In this case, the tambourine sheet 17 is stretched taut radially uniformly, by the cooperation of the annular wall 11 of the cylindrical frame 10 and the concaved surface 14 of the tightening ring 13. Further, the tightening ring 13 is fastly secured to the cylindrical frame 10 since the projections 15 of the former are each received in each of the recesses 12 of the latter and the downwardly extending annular wall 16 of the former is in abutment against the outer peripheral surface of the latter. Furthermore, the tambourine sheet 17, clamped between the cylindrical frame 10 and the tightening ring 13, is also fastly secured to said cylindrical frame since the projections 15 of the tightening ring 13 extend through the corresponding through-holes 18 in said sheet, and there is no fear of the sheet slipping relative to the cylindrical frame.

An adhesive may be used in clamping the tambourine sheet 17 between the cylindrical frame 10 and the tightening ring 13.

Reference numeral 24 in FIG. 1 designates bells each disposed in each of openings 25 formed in the cylindrical frame 10.

Although the present invention has been described and illustrated herein in terms of a preferred embodiment thereof, it should be understood that the invention is not restricted only to the embodiment shown but many changes and modifications are possible without deviating from the spirit of the invention.

What is claimed is:

1. A tambourine comprising a cylindrical frame having a plurality of recesses formed in the upper surface thereof at a predetermined interval, a tightening ring having a plurality of projections formed on the surface confronting said cylindrical frame at a predetermined interval for interlocking engagement with said recesses respectively, a tambourine sheet having a plurality of through-holes formed in the peripheral edge portion at a predetermined interval for receiving said projections respectively when it is clamped between said cylindrical frame and said tightening ring at its peripheral edge, and a tightening member for tightening said tightening ring around said cylindrical frame.

2. A tambourine as defined in claim 1, wherein said cylindrical frame has the inner portion of the upper surface thereof raised upwardly to form an annular wall having a convexed outer surface and said plurality of recesses are formed at a predetermined interval in a flat portion of said upper surface connected to the outer periphery of said annular wall, while said tightening ring has the inner peripheral surface thereof concaved in a shape complementary to the outer peripheral surface of said annular wall.

3. A tambourine as defined in claim 1, wherein said tightening ring is formed with a downwardly extending annular wall along the outer periphery thereof for abutting engagement with the outer peripheral surface of said cylindrical frame.

4. A tambourine as defined in claim 1, wherein said tightening member has hooks formed at the upper end for engagement with said tightening ring and a horizontal section formed at the lower end at which said tightening member is secured to the cylindrical frame by means of a screw extending through an outwardly bulged portion at the lower end of said cylindrical frame.

References Cited

UNITED STATES PATENTS

| | | | |
|---|---|---|---|
| 2,934,989 | 5/1960 | Belli et al. | 84—411 X |
| 3,029,679 | 4/1962 | La Londe | 84—411 |
| 3,482,479 | 12/1969 | Della-Porta | 84—418 X |

FOREIGN PATENTS

| | | | |
|---|---|---|---|
| 61,858 | 1891 | Germany | 84—418 |

RICHARD B. WILKINSON, Primary Examiner

J. F. GONZALES, Assistant Examiner